(No Model.)
C. R. LONG.
SPECTACLE CASE.
No. 410,798. Patented Sept. 10, 1889.
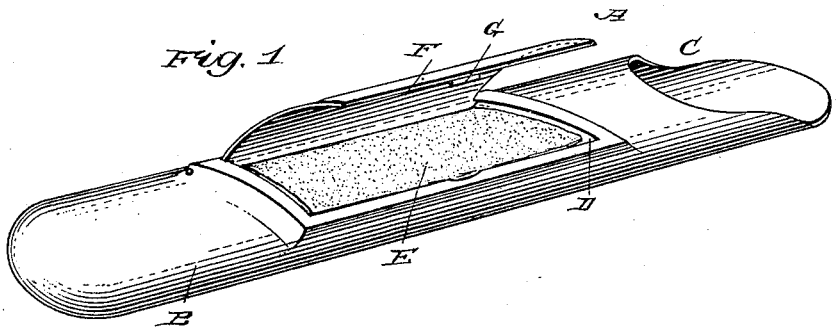
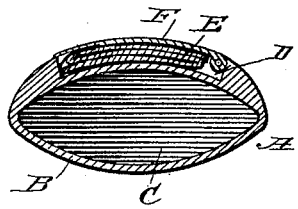
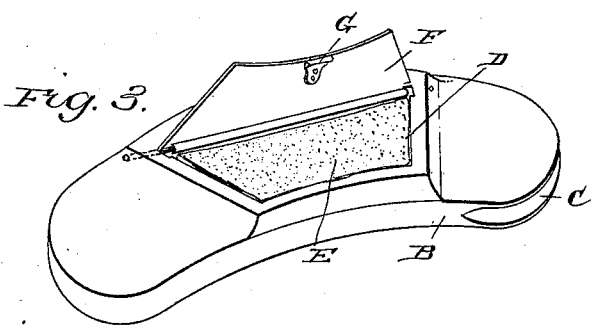
WITNESSES:
W. R. Davis
C. Sedgwick
INVENTOR:
C. R. Long
BY Munn & Co.
ATTORNEYS.

UNITED STATES PATENT OFFICE.

CHARLES R. LONG, OF LOUISVILLE, KENTUCKY.

SPECTACLE-CASE.

SPECIFICATION forming part of Letters Patent No. 410,798, dated September 10, 1889.

Application filed December 29, 1888. Serial No. 294,919. (No model.)

*To all whom it may concern:*

Be it known that I, CHARLES R. LONG, of Louisville, in the county of Jefferson and State of Kentucky, have invented a new and Improved Spectacle-Case of which the following is a full, clear, and exact description.

The object of the invention is to provide a new and improved spectacle-case serving as a convenient holder for spectacles or eye-glasses, and also for keeping a piece of soft chamois-skin or other article for wiping the glasses.

The invention consists of a casing provided with the usual compartment for the spectacles or eyeglasses and a second compartment closed by a lid and serving to retain the glass-wiper.

The invention also consists in certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a perspective view of the improvement as used for spectacles. Fig. 2 is a transverse section of the same, and Fig. 3 is a perspective view of the improvement as used for eyeglasses.

The improved spectacle-case A is provided with the usual shell B, made either in the shape shown in Fig. 1, if used for spectacles, or in the shape shown in Fig. 3, when employed for eyeglasses.

In the shell B is formed the usual compartment C for the spectacles or eyeglasses, and on top of the shell is formed a compartment D, of sufficient size to retain a piece of chamois-skin or other material for wiping the glasses. The compartment D is closed by a lid F, preferably hinged at one end to the compartment D, and provided at its free end with a lock G, of any approved construction, to hold the lid closed on the compartment. The lock G permits an easy opening of the lid, so that the operator can conveniently remove the wiper E in order to clean the lenses of the spectacles or eyeglasses. After using, the wiper is placed back in the compartment D and the lid F is closed again. The spectacle-case can then be located in a suitable place while the glasses are being used.

Having thus described my invention, what I claim as new, and desire to secure by Letters Patent, is—

1. As an improved article of manufacture, a case for spectacles or eyeglasses formed on one face with an integral hollow enlargement forming a second compartment, and a cover therefor flush with the surface of said second compartment, substantially as set forth.

2. As a new article of manufacture, a spectacle-case comprising a shell having a compartment for the reception of the spectacles or eyeglasses, a second compartment formed on top of the shell for the reception of a wiper, and a lid for closing the second compartment, substantially as shown and described.

CHARLES R. LONG.

Witnesses:
    H. C. RODES,
    OSCAR FENLEY.